United States Patent [19]

Willis

[11] Patent Number: 4,641,437

[45] Date of Patent: Feb. 10, 1987

[54] GAUGE FOR COMPARING CIRCUMFERENCES

[75] Inventor: W. Coy Willis, Hagerstown, Ind.

[73] Assignee: Aluminum Company of America, Pittsburgh, Pa.

[21] Appl. No.: 667,131

[22] Filed: Nov. 1, 1984

[51] Int. Cl.[4] .......................... G01B 3/34; B07C 5/00
[52] U.S. Cl. .................................. 33/522; 33/178 E; 33/550; 209/531; 209/601
[58] Field of Search ............... 209/522, 523, 529–532, 209/597, 598, 600, 601; 33/178 R, 178 B, 176, 178 E, 179, 522, 550

[56] References Cited

U.S. PATENT DOCUMENTS

| | | | |
|---|---|---|---|
| 2,035,082 | 3/1936 | Markwick | 33/178 B |
| 2,119,037 | 5/1938 | Bauer | 33/179 |
| 2,377,020 | 5/1945 | Lundeberg | 33/178 B |
| 2,664,642 | 1/1954 | Rae | 33/178 B |
| 2,801,475 | 8/1957 | Meyer, Jr. | 33/179 |
| 3,012,665 | 12/1961 | Hanot et al. | 209/532 |
| 3,183,601 | 5/1965 | Niles | 33/179 |
| 3,303,572 | 2/1967 | Vreeland, Jr. | 33/178 E |
| 3,407,931 | 10/1968 | Vincent | 209/531 |
| 4,008,525 | 2/1977 | Zappia | 33/178 R X |
| 4,437,242 | 3/1984 | Battle | 33/178 B |

Primary Examiner—Robert B. Reeves
Assistant Examiner—Edward M. Wacyra
Attorney, Agent, or Firm—Max L. Williamson

[57] ABSTRACT

A gauge having a substantially circular band capable of being deformed out-of-round from the application of a predetermined force and having a specified inner circumferential length to be compared with the length of a circumference around an object. The gauge further includes a support body adapted to connect with the band so as not to enable positioning the band in coaxial alignment with the object circumference and allow the band to flex and deform in circumscribing the circumference when the band is moved axially to accomplish such circumscribing.

14 Claims, 8 Drawing Figures

GAUGE FOR COMPARING CIRCUMFERENCES

BACKGROUND

This invention relates to a device for checking dimensional tolerances. More particularly, the invention is a gauge for checking the circumferential length around an object at a desired location to determine if such length is within a predetermined tolerance limit.

In the manufacture of an object, certain dimensions on the object may be considered critical; that is, it may be desirable to make the article with such certain dimensions as close as possible to a specified or nominal dimension. The degree of closeness to nominal which may be attained in making the object is a function of many factors, such as the material from which the article is made, method of manufacture, costs of manufacture, etc. Regardless of the amount of variance of the dimension which may be allowed away from the nominal dimension, such variance is typically expressed as a plus or minus value away from the nominal. Thus, if the object is a cylinder or has a cylindrical portion, the outside diameter of the cylinder or cylindrical portion may be critical, and the diameter would typically be expressed as the nominal diameter "x" plus or minus a value "y". The expressed variance is termed a tolerance, and such tolerance may be applied all on the plus side away from nominal, all on the minus side away from nominal, or distributed in any way between plus or minus as the manufacturer and user of the article agree. Variance of the diameter from nominal may result in the cylinder being uniformly larger or smaller in diameter than desired, or it may result in a condition referred to as out-of-round. An out-of-round condition results if the diameter varies away from nominal nonuniformly, and such a condition may not be desirable even though the variance of the diameter away from nominal may be within the allowable diameter tolerance limits. For this reason, it is not unusual that a further tolerance is established relating to out-of-roundness, and this tolerance is typically expressed as a variance away from a mean diameter. The mean diameter is the average of the measurement of any two diameters transverse to one another.

Heretofore, manufacturers have typically checked substantially circular portions of objects for tolerance variations by taking diametrical measurements with micrometers, calipers and the like which may be time-consuming and inefficient. In many instances, even though nominal dimensions and tolerances are expressed with respect to diameters, it is the circumferential length which is critical, and it would be desirable to measure or gauge the circumferential length without the necessity of taking diametric measurements.

For example, bottles for packaging goods are often closed with a metal or plastic closure referred to as a tamper-evident closure. Typically, the closure is comprised of a cap having a top wall, a skirt depending therefrom which is adapted for selective engagement or disengagement with the bottle, and an annular band depending from the cap and connected to the skirt by frangible means. The band is adapted to engage with a portion of the bottle after the closure has been applied thereto, and when the cap is disengaged from the bottle, the frangible means fractures causing the band to separate from the cap and provide evidence that tampering with the closure has occurred. A widely used feature on a bottle to engage with a closure is a flange projecting outwardly from the bottle which locks with a portion of the band underlying the flange.

A typical tamper-evident metal closure is referred to as a roll-on closure and is adapted for assembly with a threaded bottle. The closure, as provided to the packager, is an unthreaded thin metal shell. The packager feeds the shell to a capping machine which applies the shell over the open mouth of a bottle, and rollers bear against the shell and form threads conforming to the bottle and roll the band under the bottle flange.

A typical plastic tamper-evident closure is molded substantially to its finished form and is supplied to the packager for engagement with the bottle without requiring any reforming of the closure after application. The tamper-evident band includes an inwardly projecting lug which rides over and snaps under the bottle flange as the closure is screwed onto the bottle.

If the flange of the bottle has a circumferential length greater than the inner circumferential length of the band, the closure will not assemble with the bottle unless the band is capable of stretching to the degree that the inner circumference is at least equal in length to the length of the flange circumference. This is true, whether the circumference of the flange is round or out-of-round.

In the case of a metal closure, the band cannot be stretched to effect an assembly without damaging the frangible bridges which connect the band to the cap. If a metal closure is to be used to seal a bottle, therefore, the circumferential length of the flange cannot exceed the length of the inner circumference of the band. If the closure is a plastic material, the band will stretch at least to some degree, but the fragile nature of the band and the frangible connection between the band and cap limit the amount of stretch which can be accommodated. Since closure bands, whether metal or plastic, are flexible, they can deform to pass over a bottle flange which is considerably out-of-round so long as the length of the flange does not exceed a specific limiting value. It may be seen, therefore, that a specific circumferential length of the bottle flange is the determinant as to whether an assembly between the closure and bottle can be made.

If the flange circumference were always round, variations in circumferential length could be readily determined from diametrical measurements. Such is not the case, however, if the flange is out-of-round since diameters will vary from one measuring site to another, and the length of the circumference cannot be readily determined from such measurements.

Heretofore, flanges and other portions of bottles intended to be circular have typically been checked dimensionally by measuring diameters. Such a method is time-consuming and inefficient. From the foregoing, it may be seen that it may be the circumferential lengths of one or more such portions which may be critical, rather than the diameter, and a rapid, efficient method of checking the circumferential length of bottle portions would be advantageous.

SUMMARY OF THE INVENTION

A gauge of this invention is a flexible band having an inner circumference substantially equal in length to the allowable circumferential length around the object to be gauged. The band is connected to a support by means which does not restrict flexure of the band.

To use the gauge, the support having the band connected thereto is assembled with a handle or holder, and the holder is positioned so as to allow the band to circumscribe an object at a location on the article where a dimensional check is desired. If, for example, the article is a cylinder, the band is positioned above and in coaxial alignment with the cylinder. To check the circumference of the cylinder at a given location for a variation in circumferential length in excess of allowable on the plus side of a specified nominal length, the band has an inner circumferential length substantially equal to the maximum allowable circumferential length at the given location. Upon lowering the band while remaining coaxially aligned, the cylinder would be within the plus side tolerances so long as the band could be made to circumscribe the cylinder at the desired location. To the contrary, if the band is unable to circumscribe the cylinder at the desired location, the cylinder would not be within tolerance and the cylinder would be subject to rejection.

To check the cylinder for tolerances on the minus side of nominal, the band has an inner circumferential length substantially equal to the minimum allowable circumferential length around the cylinder. In this case, if the band could not be made to circumscribe the cylinder at the desired location, the cylinder would be within tolerance on the low side, but if the band could be made to circumscribe the cylinder, it would be outside of the allowable low side tolerance.

It is an object of this invention to provide a gauge suitable for comparing a circumferential length of objects with an allowable circumferential length.

It is also an object of this invention that such comparing may be accomplished on circumferential portions of objects which are out-of-round.

It is an advantage of this invention that such comparing may be accomplished without the use of calipers, micrometers, or the like.

These and other objects and advantages of a gauge of this invention will be more apparent with reference to the following description of a preferred embodiment and the appended drawings.

DESCRIPTION OF A PREFERRED EMBODIMENT

A gauge of this invention will be described with respect to a gauge suitable for checking the exterior circumferential length of a flange portion of a beverage bottle which is provided for engaging the band of a tamper-evident closure therewith.

Figure 1:
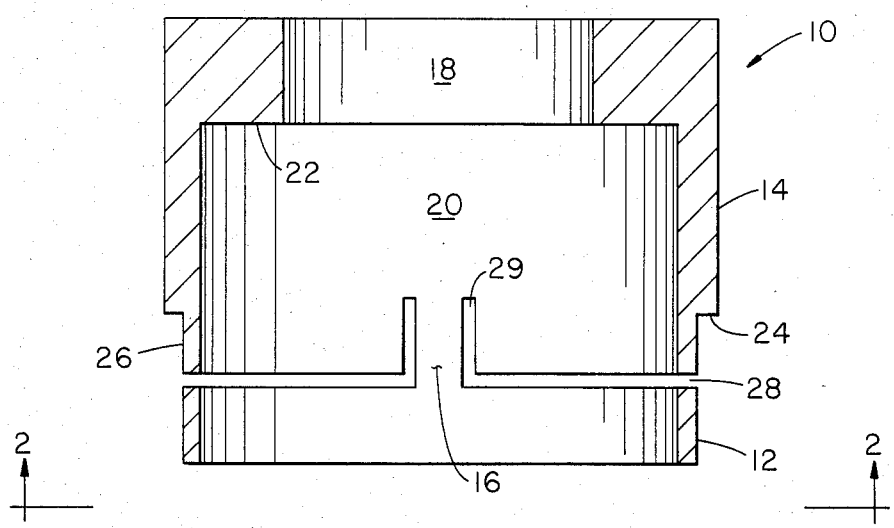
FIG. 1 is a cross-sectional elevation view of a gauge of this invention.
Figure 2:
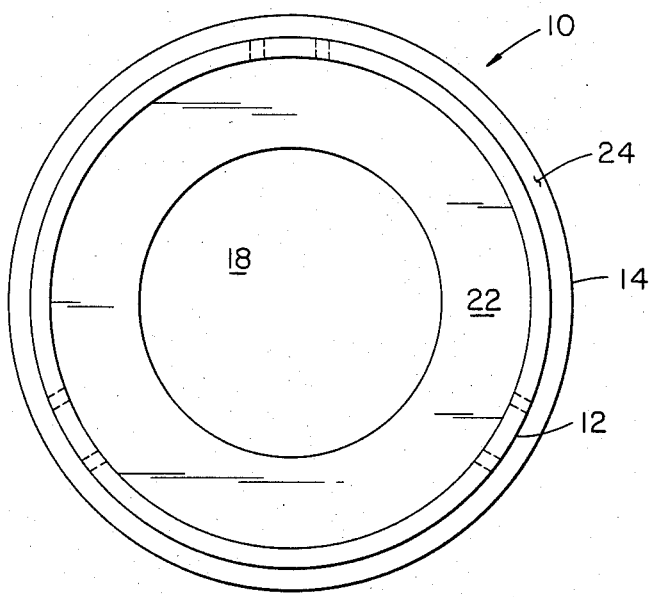
FIG. 2 is a plan view from the bottom of the gauge shown in FIG. 1.

A preferred embodiment of a gauge 10 of this invention for checking the circumference of a bottle flange is shown in FIGS. 1 and 2. Preferably, the gauge is made from hardened steel; however, any material having sufficient flexibility and wear-resistant characteristics for the intended use of the gauge is suitable. The gauge 10 is cylindrical having a flexible band 12 connected to a band support 14 by straps 16. The band support 14 is a hollow cylinder having a central bore 18, a counterbore 20 terminating at an inner annular shoulder 22, an annular outer shoulder 24, and a thin wall cylindrical portion 26 extending downwardly from the annular outer shoulder. The band 12 is completely separated the thin wall cylindrical portion 26 by a circumferential slot 28 except at three equally spaced strap 16 locations. The straps 16 extend upwardly from the upper edge of the band 12 into notches 30 in the thin wall portion 26, and the straps 16 join with the thin wall portion of the band support at the base of the notches. The band 12 is supported, therefore, in a manner which permits the band to be freely radially flexed and deformed. The dimensions of the gauge, such as thickness of the band 12, width of the slot 28, distance from the inner annular shoulder 22 to the bottom edge of the band, for example, are functions of the material from which the gauge is made and the particular use for which the gauge is intended. In this preferred embodiment, the band thickness is 0.005 inch, since a band of this thickness will deform with respect to an out-of-round bottle flange with a relatively small force when the gauge is used as a hand-held device. The flange may be conveniently checked for both the maximum allowable circumferential length and minimum allowable circumferential length by using gauges of this invention. The maximum circumferential length of the flange is critical with respect to effecting an assembly between the bottle and a closure. It is also critical, however, that the circumferential length of the flange not be less than a specific minimum value to insure that there is sufficient engagement between the closure band and bottle flange upon assembly.

Figure 3:
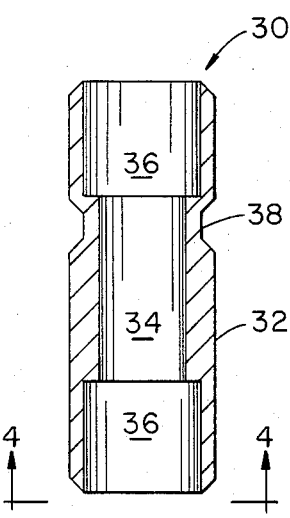
FIG. 3 is a cross-sectional elevation view of a holder suitable for assembly with a gauge of this invention.
Figure 4:
FIG. 4 is a plan view of the holder shown in FIG. 3.
Figure 5:
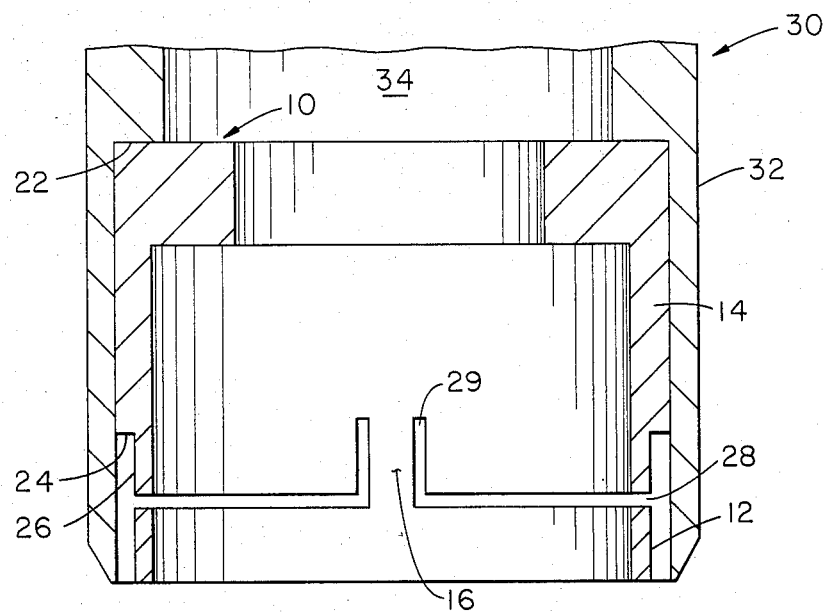
FIG. 5 is a cross-sectional elevation view of the gauge shown in FIG. 1 in assembly with a fragmentary portion of the holder shown in FIG. 4.

For ease in handling and use of the gauge, a handle as shown in FIGS. 3 and 4 is provided. The handle 30 is a body 32 having a central bore 34 and counterbores 36 on both ends thereof. The exterior of the body 32 has a hexagonal configuration only for ease of handling. The exterior may be any configuration preferred by the user. The diameter and depth of each counterbore 36 are those which will accommodate a snug fit of a gauge 10 therewithin. Since the band 12 is relatively thin and susceptible to damage during handling of the gauge, it is desirable that the depth of the counterbore be sufficient to recess the band totally within the counterbore, as shown in FIG. 5. It may be seen that the outer shoulder 24 on the support 14 provides clearance between the handle and the band 12 so that the band may flex and deform without interference. As an alternative to a snug fit, the gauge and counterbore may be adapted in any other manner to effect an assembly. The gauge and counterbore might be adapted for a threaded connection, for example.

The handle includes counterbores in both ends to accommodate a gauge to check maximum circumferential flange length in one end and a gauge to check minimum circumferential flange length in the other. An annular groove 38 circumscribes the handle and is offset from the midpoint of the axial length of the handle to identify the gauges disposed in the opposing ends of the handle. With the minimum and maximum gauges thus mounted in the handle, a user can first check for maximum circumferential length of the bottle flange and with a simple manipulation of the handle then check for the minimum circumferential length of the flange.

Figure 6:
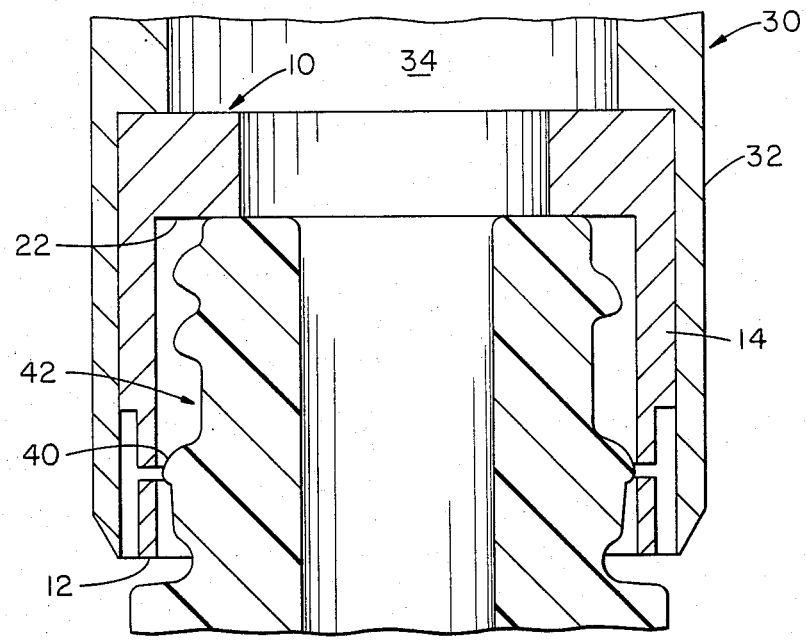
FIG. 6 is a cross-sectional elevation view of a gauge of this invention in a gauging position on a bottle that is within an allowable circumferential length tolerance on the plus side.

To check the maximum circumferential length of a bottle flange, the inner circumferential length of the band 12 is substantially equal to the specified maximum allowable circumferential length of the bottle flange. To use the gauge 10 to check the maximum circumferential length of the flange 40 on a bottle 42, the handle 30 having the gauge therein is positioned over the bottle with the band 12 downward and with the gauge in coaxial alignment with the bottle. The gauge is then lowered over the bottle mouth while maintaining the handle in coaxial alignment with the bottle. If the band 12 clears the bottle flange 40 or deforms to conform to the circumference of the flange and circumscribe the flange, as shown in FIG. 6, then the flange 40 would be considered within the predetermined plus side circumferential length tolerance. If, however, the band 12 could not be deformed sufficient to circumscribe the flange under application of a minimal force, the bottle would be subject to rejection. It may be seen that the inner annular shoulder 22 on the gauge support 14 is a stop to arrest the downward travel of the gauge. Preferably, the distance from the shoulder 22 to the top of band 12 is no less than the distance from the top of the bottle mouth to a radial plane passing through the outermost extent of the bottle flange.

Figure 7:
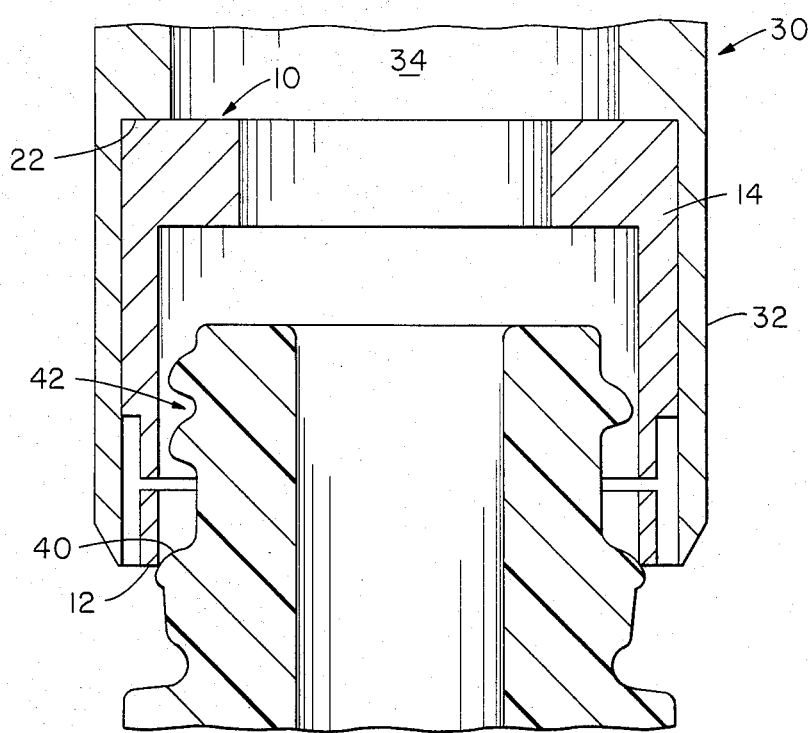
FIG. 7 is a cross-sectional elevation view of a gauge of this invention in a gauging position on a bottle that is within an allowable circumferential length tolerance on the minus side.

The gauge for checking the minimum circumferential length of the flange 40 is connected to the opposite end of the handle and includes a band 12 having an inner circumferential length substantially equal to the specified minimum circumferential length of the flange. To check the flange for minimum circumferential length, the gauge is positioned and lowered over the bottle mouth, as previously described. If the band 12 does not circumscribe the flange 40 or cannot be made to flex or deform sufficient to circumscribe the flange, as shown in FIG. 7, the flange is within minus side circumferential length tolerance. Thus, it may be seen that gauges of this invention may be conveniently used and quickly manipulated to check the circumferential length of a bottle flange.

Figure 8:
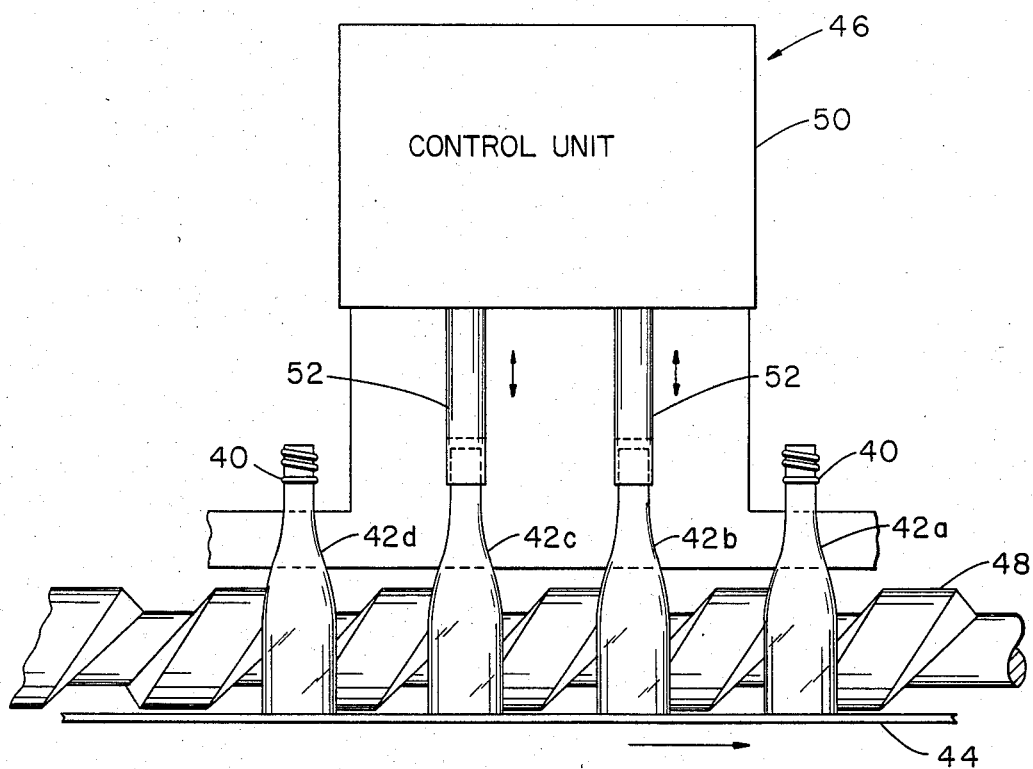
FIG. 8 is an elevation view of gauges of this invention attached to mechanical apparatus for mechanized use of the gauges.

Gauges of this invention can also be adapted for attachment or mounting to mechanical apparatus for machine operated use, as shown in FIG. 8. A continuous conveyor 44 moves bottles 42 in an upright position laterally to feed the bottles to a gauging apparatus 46. Prior to the bottles arriving at the desired position for gauging, the bottles are contacted by a continuous screw 48 which is adapted to rotate at a speed which is synchronized with the speed of the conveyor 44, and the screw is further adapted to space the bottles a predetermined distance apart. A horizontal rail or other such barrier (not shown) is disposed parallel to and spaced apart from the screw 48 a distance sufficient to maintain the bottle in contact with the screw. The gauging apparatus 46 comprises a power and control unit 50 and gauge support shafts 52 adapted for selective vertical and lateral movement which are connected thereto. The shafts 52 are spaced apart axially a distance equal to the distance between the axes of bottles contacted by the continuous screw 48. The free end of the support shafts 52 are adapted to receive and hold gauges of this invention by a friction fit as shown in FIG. 5. It is to be noted that the means of attachment of a gauge of this invention is not critical. For example, a gauge 10, as shown in FIG. 1, could be provided with a threaded central bore 18 and an assembly be effected by engaging such thread with a threaded end of support shaft 52. One of the gauges shown on shafts 52 checks for maximum circumferential length of the bottle flange 40 and the other checks the minimum circumferential length, as has been previously discussed.

For convenience, the use of the gauging apparatus 46 will be described with the bottles moving continuously from left to right as indicated by the directional arrow in FIG. 8. A first bottle 42a has passed through the gauging apparatus 46, a second bottle 42b and third bottle 42c are shown with gauges of this invention in a gauging position with respect to the bottles, and a fourth bottle 42d is shown prior to passage through the apparatus. Camming and control means in the power and control unit 50 control movement of the support shafts 52 in synchronization with the bottle movement. In FIG. 8, the gauges are in gauging position with respect to the bottles 42b and 42c and shafts 52 are adapted to move laterally with the bottles. At the completion of the gauging cycle, the shafts 52 are moved vertically upward to be clear of the bottles, as shown by the dashed lines. As bottle 42d then advances toward the position formerly occupied by bottle 42c, shafts 52 move laterally from right to left to a position above bottles 42c and 42d. The shafts are then moved downwardly in coaxial alignment with bottles 42c and 42d while moving laterally from left to right in synchronization with the bottle movement, and the gauging cycle is repeated with bottles 42c and 42d. Thus, gauges of this invention may be adapted for continuous checking of the circumferential length of bottle flanges.

As has been explained earlier, a gauge of this invention for checking maximum circumferential length of the bottle flange 40 is adapted to pass over the flange if the bottle is within tolerance, and a gauge for checking minimum circumferential length is adapted to be stopped by the flange if the bottle is within tolerance. The distance of allowable travel of the respective gauges can be predetermined, therefore, and a monitoring means in the control unit 50 can be set to sense increased or foreshortened movement of the gauges, as the case may be, when an out-of-tolerance bottle is gauged. An indicating alarm, such as a light, for example, may be connected with the monitoring means to indicate the defective bottle, or the monitoring means may be connected with ejection means which ejects the defective bottle at a station a predetermined distance from the apparatus.

In a further adaptation of the apparatus shown in FIG. 8, a spring actuated plunger or knock-out pin may be provided in a central bore of shafts 52 to operate through the bore of the gauge mounted on the shaft end. During the gauging cycle, such plunger is retracted so as to not interfere with operation of the gauge. At the end of the gauging cycle, as the shafts 52 are raised to a position to clear the bottle, the plunger is released and travels through the bore of the gauge a distance sufficient to dislodge any bottle which might inadvertently become lodged in the gauge during the gauging cycle.

Although a gauge of this invention has been described with respect to its use for checking the circumference of a bottle flange, it is apparent that such a gauge can be adapted for use with other bodies having circumferences or circumferential portions.

What is claimed is:

1. A gauge for comparing a circumferential length around an object with a specified circumferential length, the gauge comprising:

an endless substantially circular band having sufficient flexibility to be deformed out-of-round, and said band also having a specified inner circumferential length to be compared with a circumference around the object; and means for supporting said band coaxially with the circumference of the object to be compared and which allows said band to flex and deform in circumscribing and uniformly contacting the circumference around the object to be compared when the object and said band have axial movement relative to one another to accomplish such circumscribing and thereby establish whether the object circumference is within a specified length tolerance.

2. A gauge as claimed in claim 1 which further includes stop means for limiting the relative axial movement between said band and the object.

3. A gauge as claimed in claim 1 wherein said means for supporting said band is a support body having said band connected thereto by flexible means.

4. A gauge as claimed in claim 3 wherein said flexible means is at least two straps.

5. A gauge as claimed in claim 3 wherein the support body is substantially cylindrical and in coaxial alignment with said band.

6. A gauge as claimed in claim 5 wherein the flexible means is at least two straps.

7. A gauge as claimed in claim 6 wherein the body includes a portion having an inner circumference no less in length than the circumferential length of said band, and said band depends from such portion and is connected therewith by the straps.

8. A gauge as claimed in claim 7 which further includes a portion of the support projecting inwardly into the support from the portion having an inner circumference no less in length than the circumferential length of said band, the inwardly projecting portion adapted to cooperate with a portion of the object and thereby limit the axial movement of the gauge when circumscribing the circumference of the object.

9. A gauge as claimed in claim 1 which further includes a holder having means for assembling with said band support means.

10. A gauge as claimed in claim 9 wherein said holder has an axial length and opposing ends, and each of such ends is adapted for assembly with said band support means.

11. A gauge as claimed in claim 9 wherein said holder further includes a portion spaced away from and circumscribing said band whereby said band is protected from damage.

12. A gauge as claimed in claim 1 wherein said gauge includes power means connected with said band support means whereby said band may be power driven to enable circumscribing and maintaining at least a portion of said band around the object in the plane having the object circumference to be compared therein.

13. A gauge as claimed in claim 12 wherein said gauge further includes monitoring means for monitoring a predetermined length of axial travel of said gauge in comparing the length of the object circumference.

14. A gauge as claimed in claim 12 which further includes transport means to transport the object having the circumference to be compared in length thereon to a position whereby the circumference is in coaxial alignment with said band.

* * * * *